US012795490B2

(12) United States Patent
Su et al.

(10) Patent No.: US 12,795,490 B2
(45) Date of Patent: Nov. 10, 2026

(54) CONTROLLING WIRELESS POWER TRANSFER

(71) Applicant: Nokia Technologies Oy, Espoo (FI)

(72) Inventors: Lei Su, Beijing (CN); Dawei Wu, Beijing (CN); Jedrzej Stanczak, Wroclaw (PL); Rui Zheng, Beijing (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 327 days.

(21) Appl. No.: 18/561,071

(22) PCT Filed: Jun. 24, 2021

(86) PCT No.: PCT/CN2021/102209
§ 371 (c)(1),
(2) Date: Nov. 15, 2023

(87) PCT Pub. No.: WO2022/266968
PCT Pub. Date: Dec. 29, 2022

(65) Prior Publication Data
US 2024/0298235 A1 Sep. 5, 2024

(51) Int. Cl.
*H04W 36/24* (2009.01)
*H04W 52/02* (2009.01)
(Continued)

(52) U.S. Cl.
CPC ....... *H04W 36/24* (2013.01); *H04W 52/0261* (2013.01); *H02J 50/001* (2020.01); *H02J 50/20* (2016.02)

(58) Field of Classification Search
CPC . H04W 36/24; H04W 52/0261; H02J 50/001; H02J 50/20; H02J 50/80; H04B 5/79
(Continued)

(56) References Cited

U.S. PATENT DOCUMENTS 11,122,523 B2 9/2021 You et al.
11,245,444 B2 2/2022 Faxér et al.
(Continued)

FOREIGN PATENT DOCUMENTS

CN 102792553 A 11/2012
CN 106300465 A 1/2017
(Continued)

OTHER PUBLICATIONS

"3rd Generation Partnership Project; Technical Specification Group Radio Access Network; NR; Radio Resource Control (RRC) protocol specification (Release 16)", 3GPP TS 38.331, V16.4.1, Mar. 2021, pp. 1-949.
(Continued)

*Primary Examiner* — Michael Y Mapa
(74) *Attorney, Agent, or Firm* — Volpe Koenig

(57) ABSTRACT

Embodiments of the present disclosure relate to devices, methods, apparatuses and computer readable storage media for controlling wireless power transfer. According to embodiments of the present disclosure, a first device (e.g., a terminal device) requests a second device (e.g., a network device) for power supply from the second device to the first device. The second device allocates a resource dedicated for a power transfer signal from the second device. The power transfer signal is used to provide power to the first device. The second device transmits configuration information indicating the dedicated resource to the first device. The first device receives the power transfer signal based on the configuration information.

15 Claims, 9 Drawing Sheets

(51) Int. Cl.
*H02J 50/00* (2016.01)
*H02J 50/20* (2016.01)

(58) Field of Classification Search
USPC .................................. 370/331; 455/436–444
See application file for complete search history.

(56) References Cited

U.S. PATENT DOCUMENTS

| | | | | |
|---|---|---|---|---|
| 2007/0021140 | A1* | 1/2007 | Keyes, IV | H04W 52/56 455/522 |
| 2014/0194092 | A1* | 7/2014 | Wanstedt | H04W 4/24 455/406 |
| 2015/0372503 | A1 | 12/2015 | Toncich et al. | |
| 2016/0020649 | A1* | 1/2016 | Bell | H02J 50/20 307/104 |
| 2016/0249157 | A1 | 8/2016 | Fine | |
| 2020/0235784 | A1 | 7/2020 | Youn et al. | |
| 2021/0167638 | A1* | 6/2021 | Yahagi | H02J 50/20 |
| 2022/0060061 | A1* | 2/2022 | Yahagi | H02J 50/40 |
| 2023/0057994 | A1* | 2/2023 | Elkotby | H04B 7/06952 |

FOREIGN PATENT DOCUMENTS

| | | | |
|---|---|---|---|
| CN | 106787258 | A | 5/2017 |
| CN | 109067480 | A | 12/2018 |
| CN | 109769263 | A | 5/2019 |
| WO | 2018063436 | A1 | 4/2018 |
| WO | 2021097665 | A1 | 5/2021 |

OTHER PUBLICATIONS

"3rd Generation Partnership Project; Technical Specification Group Radio Access Network; NR; Medium Access Control (MAC) protocol specification (Release 16)", 3GPP TS 38.321, V16.4.0, Mar. 2021, pp. 1-157.

"3rd Generation Partnership Project; Technical Specification Group Radio Access Network; NR; User Equipment (UE procedures in Idle mode and RRC Inactive state (Release 16)", 3GPP TS 38.304, V16.4.0, Mar. 2021, pp. 1-39.

Hu et al., "Simultaneous Wireless Information and Power Transfer: Coding and Modulation Design", ZTE Technology Journal, vol. 24, No. 5, Oct. 2018, pp. 43-46.

"About", GuRu Wireless, Retrieved on Nov. 8, 2023, Webpage available at : https://guru.inc/about/.

"Calculation of free-space attenuation", Recommendation ITU-R P.525-4, Aug. 2019, 6 pages.

"Controlling limits for electromagnetic environment", Ministry of Ecology and Environment the People's Republic of China, Electromagnetic Radiation, GB 8702-2014, Jan. 1, 2015, 9 pages.

Xia et al., "On the Efficiency of Far-Field Wireless Power Transfer", IEEE Transactions on Signal Processing, vol. 63, No. 11, Jun. 2015, pp. 2835-2847.

White, "RF to DC Converter", Bradley University Department of Electrical and Computer Engineering, 2016, pp. 1-34.

Lee et al., "300-GHz CMOS-Based Wireless Link Using 40-dBi Cassegrain Antenna for IEEE Standard 802.15.3d", IEEE International Symposium on Radio-Frequency Integration Technology (RFIT), Sep. 2-4, 2020, pp. 136-138.

Mistry et al., "A dual-band deployable Cassegrain reflector antenna for Space applications", 15th European Conference on Antennas and Propagation (EuCAP), Mar. 22-26, 2021, 5 pages.

Gustavsson et al., "Implementation Challenges and Opportunities in Beyond-5G and 6G Communication", IEEE Journal of Microwaves, vol. 1, No. 1, Jan. 2021, pp. 86-100.

Kim et al., "Signal and System Design for Wireless Power Transfer: Prototype, Experiment and Validation", IEEE Transactions on Wireless Communications, vol. 19, No. 11, Nov. 2020, pp. 7453-7469.

IEEE 802.11, Wikipedia, Retrieved on Nov. 4, 2023, Webpage available at : https://en.wikipedia.org/wiki/IEEE_802.11.

International Search Report and Written Opinion received for corresponding Patent Cooperation Treaty Application No. PCT/CN2021/102209, dated Mar. 15, 2022, 9 pages.

* cited by examiner

CONTROLLING WIRELESS POWER TRANSFER

RELATED APPLICATION

This application was originally filed as a Patent Cooperation Treaty Application No. PCT/CN2021/102209 filed on Jun. 24, 2021, which is hereby incorporated in its entirety.

TECHNICAL FIELD

Embodiments of the present disclosure generally relate to the field of telecommunications, and in particular, to devices, methods, apparatuses and computer readable media for controlling wireless power transfer (WPT).

BACKGROUND

Nowadays in the fifth generation (5G) era, bigger and bigger screens and more and more powerful baseband (e.g. cm & mm wave) chips are strongly consuming batteries of user equipment (UE), for example smart phones. However, existing battery technology limits further increase of the capacity of a battery considering people's safety. At present, the battery technology with a capacity below 3500 mAh is relatively mature. With the continuous improvement of the capacity, the safety risk of battery is also increasing.

WPT or electromagnetic power transfer is the transmission of electrical energy without wires as a physical link. In a WPT system, a transmitter device, driven by electric power from a power source, generates a time-varying electromagnetic field, which transmits power across space to a receiver device. The receiver device extracts power from the electromagnetic field and supplies it to an electrical load. The technology of WPT can eliminate the use of the wires, thus increasing the mobility, convenience, and safety of an electronic device for all users. Therefore, WPT is useful to power electrical devices where interconnecting wires are inconvenient, hazardous, or are not possible.

SUMMARY

In general, example embodiments of the present disclosure provide devices, methods, apparatuses and computer readable media for controlling WPT.

In a first aspect, there is provided a first device. The first device comprises at least one processor and at least one memory including computer program codes. The at least one memory and the computer program codes are configured to, with the at least one processor, cause the first device at least to transmit, to a second device, a first request to start power supply to the first device; receive, from the second device, configuration information concerning a resource allocated by the second device and dedicated for a power transfer signal from the second device, the power transfer signal used to provide power to the first device; and receive the power transfer signal from the second device based on the configuration information.

In a second aspect, there is provided a second device. The second device comprises at least one processor and at least one memory including computer program codes. The at least one memory and the computer program codes are configured to, with the at least one processor, cause the second device at least to receive, from a first device, a first request to start power supply to the first device; transmit, to the first device, configuration information concerning a resource allocated by the second device and dedicated for a power transfer signal from the second device, the power transfer signal used to provide power to the first device; and transmit the power transfer signal to the first device based on the configuration information.

In a third aspect, there is provided a third device. The first device comprises at least one processor and at least one memory including computer program codes. The at least one memory and the computer program codes are configured to, with the at least one processor, cause the third device at least to receive, from a first device, a first message indicating a requirement of power supply to the first device; and transmit, to the first device and a second device, a grant for the power supply to the first device by the second device.

In a fourth aspect, there is provided a fourth device. The second device comprises at least one processor and at least one memory including computer program codes. The at least one memory and the computer program codes are configured to, with the at least one processor, cause the fourth device at least to receive, from a second device or a third device associated with the second device, an amount of power used by a first device, the power provided to the first device via a power transfer signal from the second device and the power transfer signal allocated with a dedicated resource; and generate a charging event for the first device based on the amount of power.

In a fifth aspect, there is provided a method. The method comprises transmitting, at a first device to a second device, a first request to start power supply to the first device; receiving, from the second device, configuration information concerning a resource allocated by the second device and dedicated for a power transfer signal from the second device, the power transfer signal used to provide power to the first device; and receiving the power transfer signal from the second device based on the configuration information.

In a sixth aspect, there is provided a method. The method comprises receiving, at a second device from a first device, a first request to start power supply to the first device; transmitting, to the first device, configuration information concerning a resource allocated by the second device and dedicated for a power transfer signal from the second device, the power transfer signal used to provide power to the first device; and transmitting the power transfer signal to the first device based on the configuration information.

In a seventh aspect, there is provided a method. The method comprises receiving, at a third device from a first device, a first message indicating a requirement of power supply to the first device; and transmitting, to the first device and a second device, a grant for the power supply to the first device by the second device.

In an eighth aspect, there is provided a method. The method comprises receiving, at a fourth device from a second device or a third device associated with the second device, an amount of power used by a first device, the power provided to the first device via a power transfer signal from the second device and the power transfer signal allocated with a dedicated resource; and generating a charging event for the first device based on the amount of power.

In a ninth aspect, there is provided a first apparatus. The first apparatus comprises means for transmitting, to a second apparatus, a first request to start power supply to the first apparatus; means for receiving, from the second apparatus, configuration information concerning a resource allocated by the second apparatus and dedicated for a power transfer signal from the second apparatus, the power transfer signal used to provide power to the first apparatus; and means for receiving the power transfer signal from the second apparatus based on the configuration information.

In a tenth aspect, there is provided a second apparatus. The second apparatus comprises means for receiving, from a first apparatus, a first request to start power supply to the first apparatus; means for transmitting, to the first apparatus, configuration information concerning a resource allocated by the second apparatus and dedicated for a power transfer signal from the second apparatus, the power transfer signal used to provide power to the first apparatus; and means for transmitting the power transfer signal to the first apparatus based on the configuration information.

In an eleventh aspect, there is provided a third apparatus. The third apparatus comprises means for receiving, from a first apparatus, a first message indicating a requirement of power supply to the first apparatus; and means for transmitting, to the first apparatus and a second apparatus, a grant for the power supply to the first apparatus by the second apparatus.

In a twelfth aspect, there is provided a fourth apparatus. The fourth apparatus comprises means for receiving, from a second apparatus or a third apparatus associated with the second apparatus, an amount of power used by a first apparatus, the power provided to the first apparatus via a power transfer signal from the second apparatus and the power transfer signal allocated with a dedicated resource; and means for generating a charging event for the first apparatus based on the amount of power.

In a thirteenth aspect, there is provided a computer program product that is stored on a computer readable medium and includes machine-executable instructions. The machine-executable instructions, when being executed, cause a machine to perform the method according to any of the above fifth, sixth, seventh and eighth aspects.

In a fourteenth aspect, there is a computer readable storage medium comprising program instructions stored thereon. The instructions, when executed by an apparatus, cause the apparatus to perform the method according to any of the above fifth, sixth, seventh and eighth aspects.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some example embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
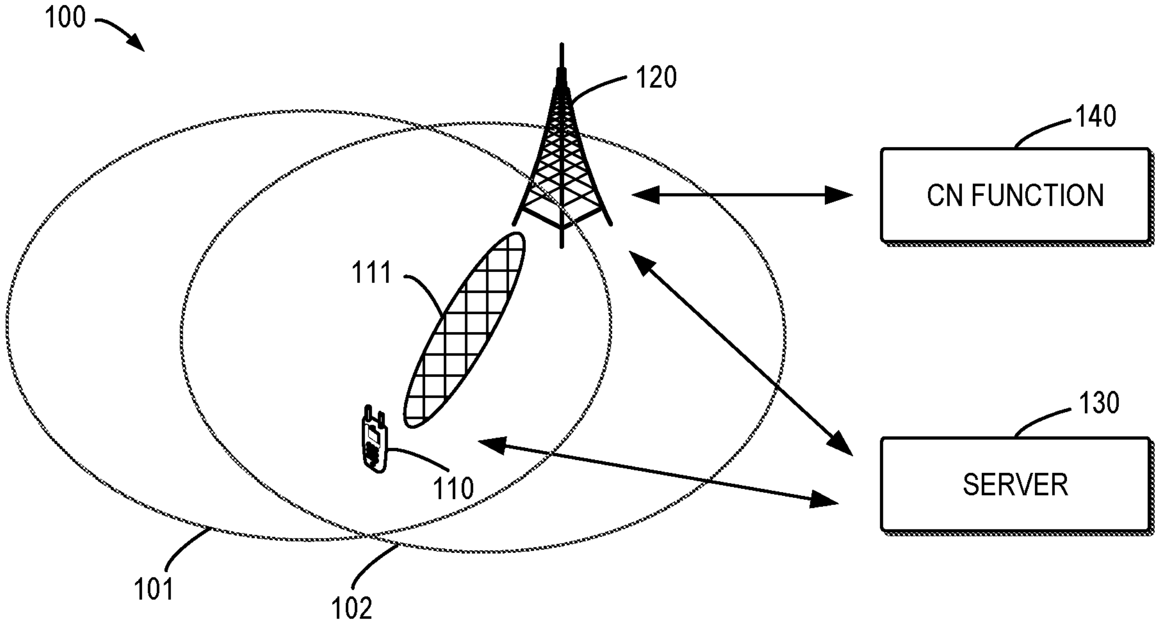
FIG. 1 shows an example communication network in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and
(b) combinations of hardware circuits and software, such as (as applicable):
   (i) a combination of analog and/or digital hardware circuit(s) with software/firmware and
   (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT), New Radio (NR) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay node, a low power node such as a femto, a pico, and so forth, depending on the applied terminology and technology. An example of the relay node may be an Integrated Access and Backhaul (IAB) node. A distributed unit (DU) part of the IAB node may perform the functionalities of "network device" and thus can operate as the network device. In the following description, the terms "network device", "BS", and "node" may be used interchangeably.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (loT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a relay node, a device operating on commercial and/or industrial wireless networks, and the like. A Mobile Termination (MT) part of the IAB node may perform the functionalities of "terminal device" and thus can operate as the terminal device. In the following description, the terms "terminal device", "communication device", "terminal", "user equipment" and "UE" may be used interchangeably.

Although functionalities described herein can be performed, in various example embodiments, in a fixed and/or a wireless network node may, in other example embodiments, functionalities may be implemented in a user equipment apparatus (such as a cell phone or tablet computer or laptop computer or desktop computer or mobile IOT device or fixed IOT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

As briefly mentioned above, WPT is useful to power electrical devices where interconnecting wires are inconvenient, hazardous, or are not possible. Generally, wireless power techniques mainly fall into two categories, near field (≈ mm, cm) and far-field (≈ km). In near field or non-radiative techniques, power is transferred over short distances by magnetic fields using inductive coupling between coils of wire, or by electric fields using capacitive coupling between metal electrodes.

In far-field or radiative techniques, which is also called power beaming, power is transferred by beams of electromagnetic radiation, like microwaves or laser beams. These techniques can transport energy over longer distance, but must be aimed at the receiver.

An important issue associated with all WPT systems is to limit the exposure of people and other living beings to potentially injurious electromagnetic fields. A UE usually locates hectometre away from a transmission and reception point (TRP) of a base station. The radio frequency (RF) power in 24 GHz harvested by the UE can be calculated with 40 dbi high gain antennas and rectennas as:

$$P_r = P_t + G_t - L_{bf} + G_r \tag{1}$$

where $P_r$ is receiving (Rx) power of the UE, $P_t$ is transmitting (Tx) power of an active antenna unit (AAU) of the TRP, $G_t$ is the Tx Antenna gain of the AAU, $L_{bf}$ is the path loss of free space transmission, $G_r$ is UE rectenna gain of the UE.

According to International Telecommunication Union (ITU) recommendation P.525 "Calculation of free-space attenuation", the path loss $L_{bf}$ in dB can be calculated as:

$$L_{bf} = 32.4 + 20\log(f) + 20\log(d) \tag{2}$$

where f is frequency in MHz, and d is distance in km.

If f=24000 Mhz, and d=0.1 km, then $L_{bf}$=100 db. If $P_t$=40 dbm (10 W), and $G_t$=$G_r$=40 dbi, then $P_r$ is about 16 dbm (~40 mW).

According to GB87022014 which is a national standard for controlling limits for electromagnetic environments, the plane ware equivalent power density at 24 G Hz shall be less than 2 W/m$^2$. This means that 10 AAUs with high gain antennas and a UE with high gain rectennas for WPT service are still safe while estimated power harvested by the UE can be 0.4 W and the WPT efficiency is 4%. Additionally, a research shows that the WPT efficiency under opportunistic scheduling is higher than the 1% value which serves as a benchmark to the success of far-field WPT.

Regarding the efficiency of converting a RF signal to a direct current (DC), a research shows that the system receives almost all of the power that is available and operates at 61.7% efficiency.

In the case where a 5G frequency range (FR2, mm Wave) AAU (4T4R 768 antennas) is used for wireless communication, the transmission power of a macro BS is usually around 2 watts (33 dBm), and the Equivalent Isotopically Radiated Power (EIRP) can reach 65 dBm currently when the antenna array gain and beam shaped gain are added. Far-field over-the-air (OTA) WPT with higher performance can be achieved if more resources, e.g. 8T8R 1024 antennas, could be integrated into an AAU.

In view of the above, it is both feasible and desirable to allow a network device (for example, a gNB) to control a fixed or moving terminal device (for example, a UE) to harvest a RF signal for charging.

Some conventional solutions have been proposed for WPT. For example, a proprietary technology called "smart lensing" enables the use of focused energy beams for power transfer. "Smart lensing", operating in the millimeter wave spectrum −24 GHZ frequency, has the ability to pinpoint specific targets for power delivery rather than flood an entire room with wireless energy. However, the OTA WPT signal of the proprietary technology will interfere with 5G communication since it's out of control of 3rd Generation Partnership Project (3GPP) radio access network (RAN).

In another far-field OTA WPT solution, RF signals can be relied upon for realizing simultaneous wireless information and power transfer (SWIPT). Thus, both the communication and charging requests of devices are satisfied. In order to realize SWIPT, wireless RF circuits have to be redesigned for improving the efficiency of WPT. The new information and communication theory has to be introduced in order to control SWIPT in both coding and modulation levels e.g. Compensatory Energy Coding, Inverse Source Coding, Constraint Coding, Wireless Data Energy Co-modulation. This requires massive and likely unacceptable updates to 3GPP specifications in 5G or later 6G. Another problem is that the charging efficiency of SWIPT is relatively low, not suitable for charging the devices with large battery capacity such as a smart phone.

In view of the above, an AAU operating at 5G FR2 creates massive beams which supply RF power in multi-watt. However, in the conventional solutions, the UE is not controllable to harvest the power. Particularly, a moving UE needs to reorient the beam for harvesting the RF power. Moreover, the process for harvesting the RF power has not been standardized in 3GPP specifications, which means it's hard to utilize the mature beam mechanism defined in 3GPP specifications for the RF power harvesting system currently.

Embodiments of the present disclosure propose a solution for controlling WPT, so as to solve the above problems and one or more of other potential problems. In this solution, a first device (e.g., a terminal device) requests a second device (e.g., a network device) for power supply from the second device to the first device. The second device allocates a resource dedicated for a power transfer signal from the second device. The power transfer signal is used to provide power to the first device. The second device transmits configuration information indicating the dedicated resource to the first device. The first device receives the power transfer signal based on the configuration information. As such, power is provided to the first device via the power transfer signal and the first device is charged accordingly.

In this way, the second device (e.g., a gNB) can control the power supply to the first device (e.g., a UE). By allocating the resource dedicated for the power supply, interference with communication signals can be avoided. Moreover, a complex coding and modulation scheme as required in the SWIPT can be avoided since there is no need to apply coding, layer mapping, rate matching, etc. to the dedicated resource.

These benefits and other benefits of the present disclosure will be apparent from the following descriptions.

Example Environment

FIG. 1 shows an example communication network 100 in which some example embodiments of the present disclosure can be implemented. The network 100 includes a network device 120 and a terminal device 110 served by the network device 120. The network 100 may provide one or more serving cells (for example, cells 101 and 102) to serve the terminal device 110. In some example embodiments, both the cells 101 and 102 are provided by the network device 120. For example, the cell 102 may be a primary cell (Pcell) and the cell 101 may be a secondary cell (Scell). Alternatively, in some example embodiments, the cell 102 is provided by the network device 120 and the cell 101 is provided by another network device (not shown). For example, in the case of Dual Connectivity, the cells 101 and 102 can be provided by two network devices.

It is to be understood that the number of terminal devices, network devices and cells is only for the purpose of illustration without suggesting any limitations. The network 100 may include any suitable number of terminal devices, network devices and cells adapted for implementing embodiments of the present disclosure. Furthermore, the functionalities of the network device 120 can be split into multiple network nodes, such as TRPs, a centralized unit (CU) and a distributed unit (DU), etc.

Communications in the communication network 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (MIMO), Orthogonal Frequency Divided Multiple Access (OFDMA) and/or any other technologies currently known or to be developed in the future.

In the communication network 100, the network device 120 can communicate data and control information to the terminal device 110 and the terminal device 110 can also communication data and control information to the network device 120. A link from the network device 120 to the terminal device 110 is referred to as a downlink (DL) or a forward link, while a link from the terminal device 110 to the network device 120 is referred to as an uplink (UL) or a reverse link.

In the communication network 100, the network device 120 is configured to implement beamforming technique and transmit signals to the terminal device 110 via one or more beams. The terminal device 110 is configured to receive the signals transmitted by the network device 120 via the one or more beams. As shown in FIG. 1, a DL beam 111 is configured for the cell 102. It is to be understood that the cell 102 may have more beams associated therewith.

In example embodiments of the present disclosure, the network device 120 supplies power to the terminal device 110. This is referred to as a wireless power control (WPC) service or WPT service. The power is supplied to the terminal device 110 through a signal from the network device 120 to the terminal device 110. Such a signal for the purpose of power supply is also referred to as a power transfer signal or a WPT signal. The terminal device 110 converts the WPT signal into DC to charge a battery of the terminal device 110.

In some example embodiments, to manage and coordinate the WPC service for different terminal devices, a WPC application (APP) may be implemented. To this end, the network 100 may further include a server 130 for the WPC APP and the terminal device 110 may act as a client running the WPC APP. The server 130 may be a Mobile Edge Computing (MEC) server implemented in any suitable part of the network 100. For example, the server 120 may be implemented in the RAN part of the network 100. Alternatively, or in addition, the server 130 may be implemented in a core network (CN) part of the network 100. The scope of the present disclosure is not limited in this regard.

In some example embodiments, the WPC service may further involve a CN function 140 for charging the WPC service by an operator of the network 100. The CN function 140 may be a Session Management Function (SMF) acting as a Charging Transfer Function (CTF).

It is to be understood that the environment 100 is shown for the purpose of illustration without any limitation to the scope of the present disclosure. Although the terminal device 110 is shown as a mobile phone, the terminal device 110 can be any suitable type of device. As an example operational deployment, the embodiments of the present disclosure may be implemented in a restricted field, for example, a smart factory. The terminal device 110 may be an Industrial Internet of Things (IIoT) device, movements of which are controlled by the network device 120.

Example Hardware Components

Figure 2A:
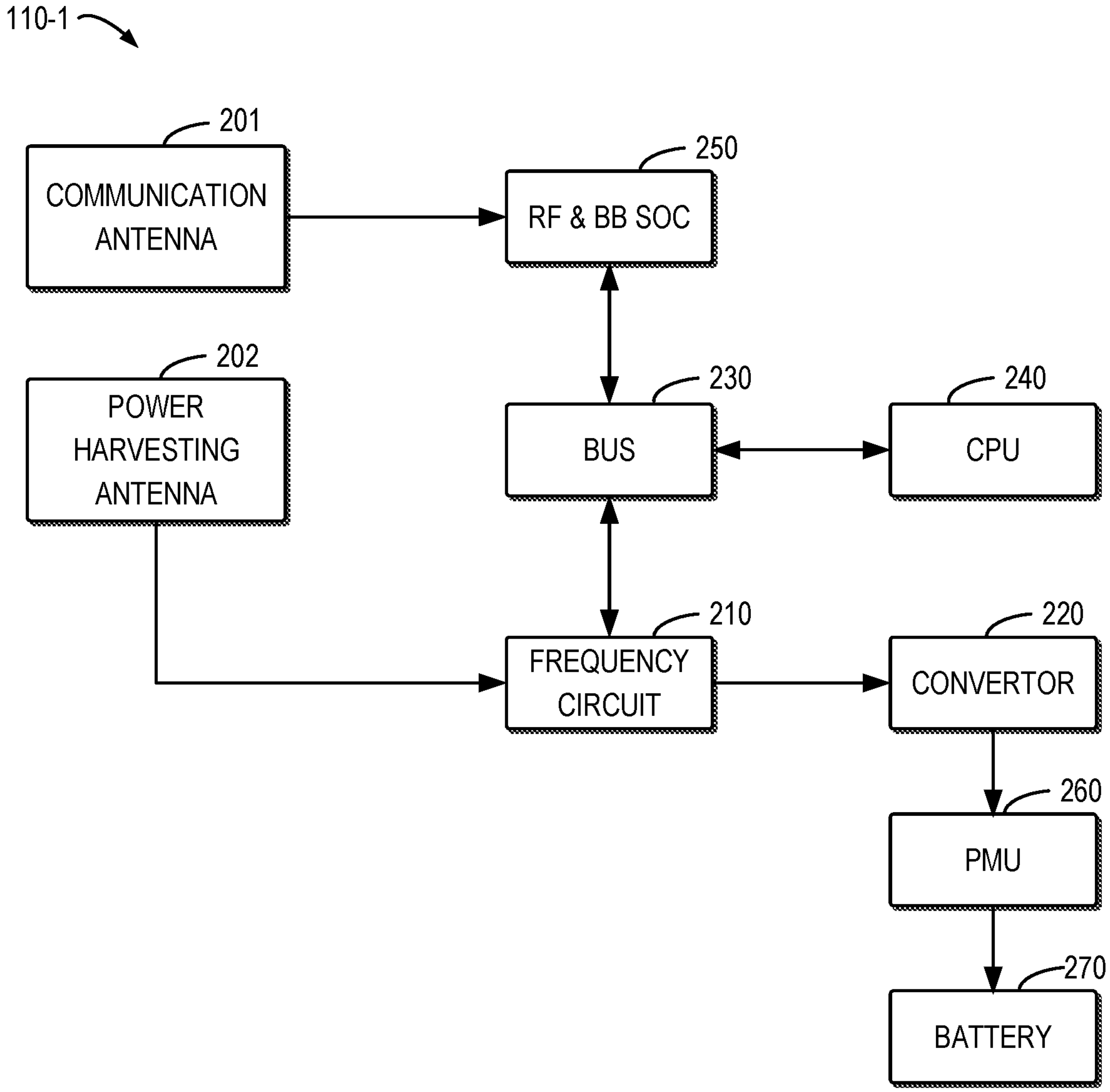
FIG. 2A illustrates a schematic diagram of an example of a terminal device according to some example embodiments of the present disclosure.

FIG. 2A shows example hardware components of a terminal device 110-1. The terminal device 110-1 can be considered as an example implementation of the terminal device 110 as shown in FIG. 1. The terminal device 110-1 comprises an internal bus 230 for interconnecting various hardware components, including but not limited to, a RF & baseband (BB) System on Chip (SoC) 250, a central processing unit (CPU) 240 and a frequency circuit 210.

In the example of FIG. 2A, a WPT signal and a communication signal are received at separated antennas. Specifically, a communication antenna 201 is coupled to the RF & BB SoC 250 and configured to receive the communication signal from the network device 120 for example. A power harvesting antenna 202 is dedicated for WPT and configured to receive the WPT signal from the network device 120 for example. The power harvesting antenna 202 is coupled to the frequency circuit 210 and the received WPT signal is delivered to the frequency circuit 210.

The frequency circuit 210 is tunable to harvest the WPT signal. For example, the frequency circuit 210 is 3GPP RAN controllable and thus can be configured by the CPU 240 according to a resource allocated by terminal device 110 and dedicated for the WPT signal. The frequency circuit 210 is coupled to a RF to DC convertor 220. The convertor 220 receives the WPT signal from the frequency circuit 210 and converts the WPT signal into DC. The DC is used by the power management unit (PMU) to charge a battery 270.

Figure 2B:
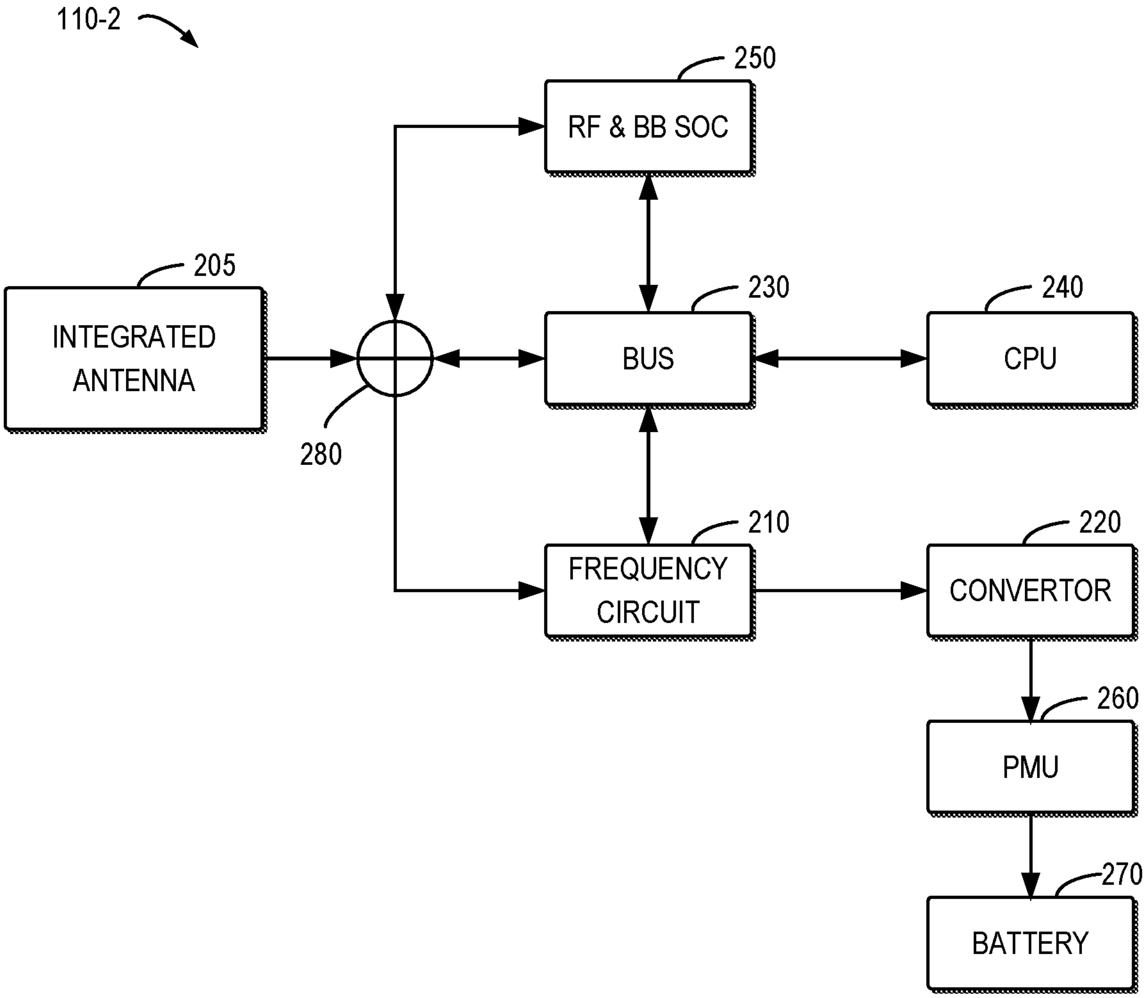
FIG. 2B illustrates a schematic diagram of another example of a terminal device according to some example embodiments of the present disclosure.

FIG. 2B shows example hardware components of a terminal device 110-2. The terminal device 110-2 can be considered as another example implementation of the terminal device 110 as shown in FIG. 1. A component with the same reference sign are the same as FIG. 2A and description thereof is not repeated.

In the example of FIG. 2B, instead of separated antennas, the terminal device 110-2 comprises an integrated antenna 205 for receiving both the communication signal and the WPT signal. In other words, wireless communication and WPC service share the same antenna.

To separately process the communication signal and the WPT signal received at the same antenna, the terminal device 110-2 comprises a switching circuit 280 coupled to the integrated antenna 205, the RF & BB SoC 250, the bus 230 and the frequency circuit 210. The switching circuit 280 is 3GPP RAN controllable and is configured to switch delivery of the signal received at the integrated antenna 205 between the RF & BB SoC 250 and the frequency circuit 210 according to resources for the communication signal and the WPT signal. For example, the CPU 240 may control the switching circuit 280 to route the WPT signal to the frequency circuit 210 during a time period allocated for the WPT signal.

It is to be understood that the hardware components in FIGS. 2A and 2B are shown for the purpose of illustration without any limitation to the scope of the present disclosure. The terminal device 110 may further comprise other components not shown. Moreover, the terminal device 110 may alternatively comprise any suitable component other than those shown in FIGS. 2A and 2B to implement respective acts as described below with respect to the process 400 and the method 500.

Figure 3A:
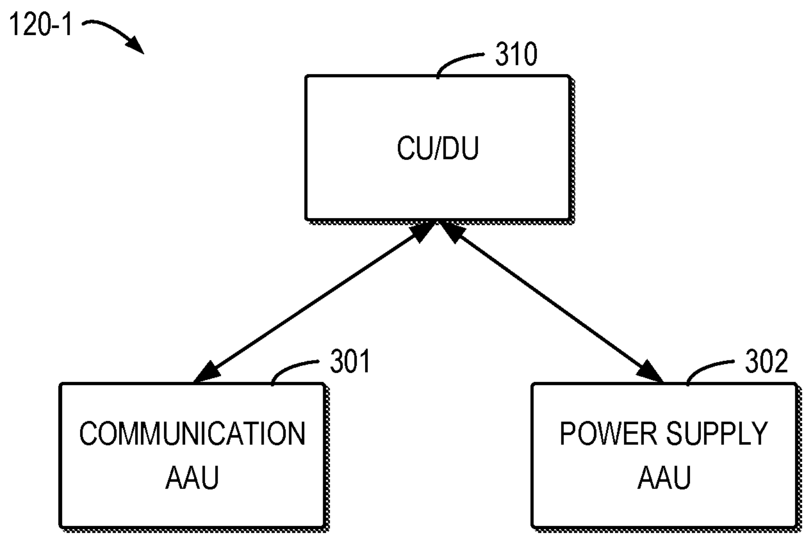
FIG. 3A illustrates a schematic diagram of an example of a network device according to some example embodiments of the present disclosure.

FIG. 3A shows example hardware components of a network device 120-1. The network device 120-1 can be considered as an example implementation of the network device 120 as shown in FIG. 1. The network device 120-1 comprises a CU/DU 310. In the example of FIG. 3A, the communication signal and the WPT signal are transmitted by separated antenna units. Specifically, a communication AAU 301 is configured to transmit the communication signal to the terminal device 110 and a power supply AAU 302 is configured to transmit the WPT signal to the terminal device 110.

Figure 3B:
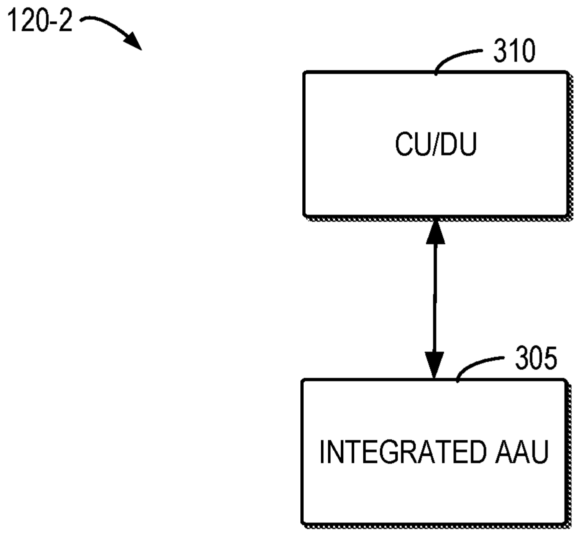
FIG. 3B illustrates a schematic diagram of another example of a network device according to some example embodiments of the present disclosure.

FIG. 3B shows example hardware components of a network device 120-2. The network device 120-2 can be considered as another example implementation of the network device 120 as shown in FIG. 1. A component with the same reference sign are the same as FIG. 3A and description thereof is not repeated. In the example of FIG. 3B, instead of separated antenna units, the network device 120-1 comprises an integrated AAU 305 for transmitting both the communication signal and the WPT signal. In other words, wireless communication and WPC service share the same antenna unit.

It is to be understood that the hardware components in FIGS. 3A and 3B are shown for the purpose of illustration without any limitation to the scope of the present disclosure. The network device 120 may further comprise other components not shown. Moreover, the network device 120 may alternatively comprise any suitable component other than those shown in FIGS. 3A and 3B to implement respective acts as described below with respect to the process 400 and the method 600.

Example Process

Figure 4:
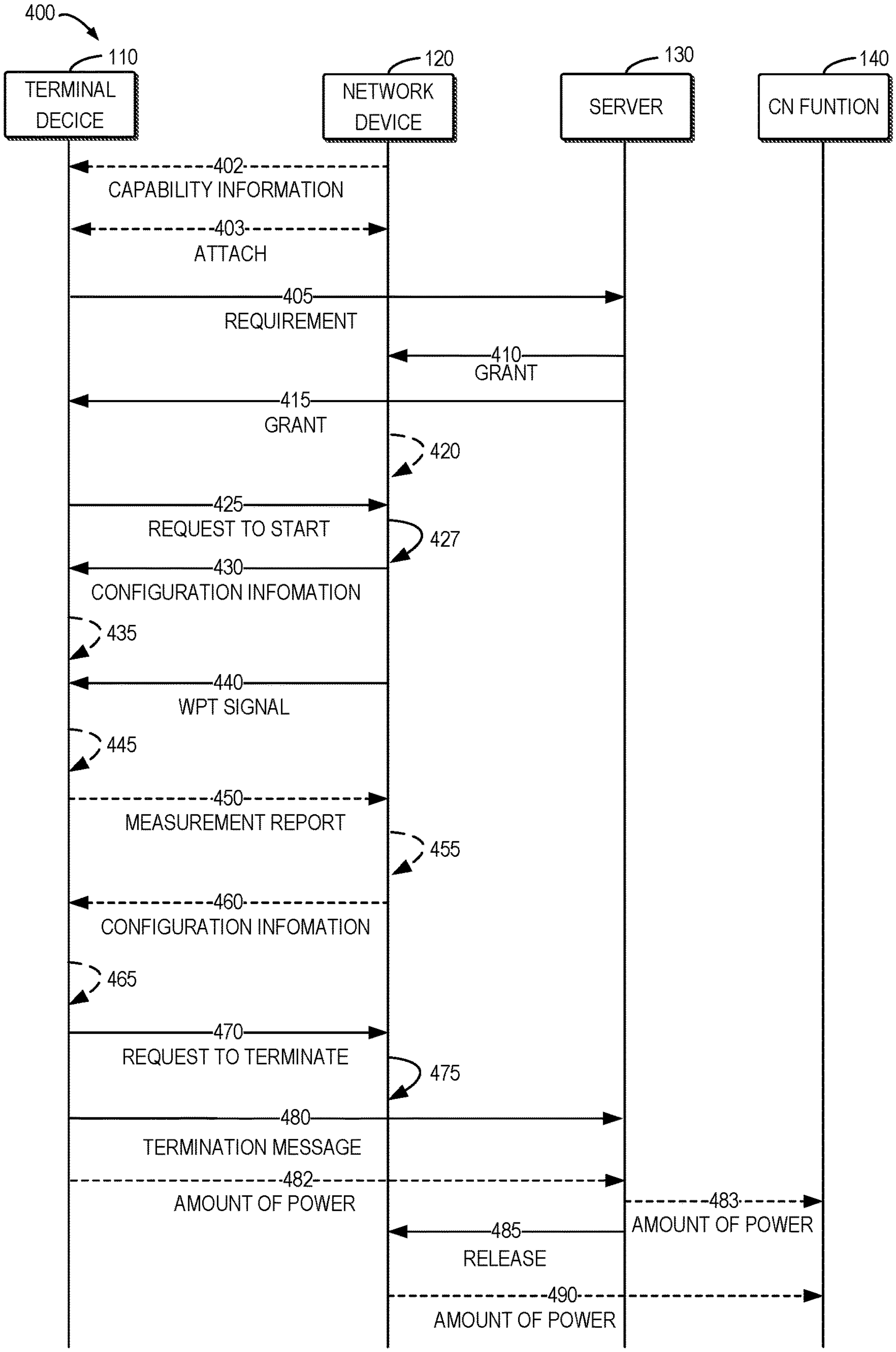
FIG. 4 illustrates a schematic diagram of an example process for WPT according to some example embodiments of the present disclosure.

FIG. 4 illustrates a schematic diagram of an example process 400 for WPT according to some example embodiments of the present disclosure. In general, the process 400 involves the terminal device 110 and the network device 120 shown in FIG. 1. In some example embodiments, the process 400 further involves the server 130 and the CN function 140 shown in FIG. 1.

The application layer of the terminal device 110 considers that the terminal device 110 is in a low battery state if the current battery level is below a threshold level (e.g., 100 mAh) or the remaining battery capacity is below a threshold capacity (e.g., 10 minutes). The application layer notifies the Access Stratum (AS) to request a WPC service.

In some example embodiments, before requesting the WPC service, the terminal device 110 in the low battery state may perform cell selection or reselection based on capability information from the network device 120. The capability information indicates a set of cells provided by the network device 120 and with a capability of power supply. As used herein, the term "capability of power supply" means the capability to provide the WPC service to a terminal device and is also referred to as "WPC capability". As shown in FIG. 4, the network device 120 may broadcast 402 the capability information in the system information to the terminal device 110. The terminal device 110 may select a cell with the capability of power supply based on the capability information and perform 403 an attach procedure to the selected cell.

In the process 400, the terminal device 110 transmits 405, to the server 130, a message indicating a requirement of the power supply to the terminal device 110. This message is also referred to as a "requirement message" or "service request" and indicates to the server 130 that the terminal device 110 needs a WPC service to start.

If the server 130 grants the WPC service to the terminal device 110 acting as an APP client, the server 130 transmits 410 to the network device 120 a grant for the power supply to the terminal device 110 by the network device 120. The grant may indicate a bandwidth available for the power supply to the terminal device 110, which is also referred to as a "WPC service bandwidth". The grant may further comprise a list of cells with the WPC capability. The server 130 also transmits 415 the grant to the terminal device 110. In this way, the terminal device 110 is granted with the WPC service from the network device 120 and the network device 120 is granted to provide the WPC service to the terminal device 110.

Upon receiving the grant from the server 130, the network device 120 determines whether a serving cell granted to provide the WPC service to the terminal device 110 has the WPC capability. If the granted serving cell lacks the WPC capability, the network device 120 may select 420, from the list of cells in the grant, a neighboring cell with the WPC capability. In some example embodiments, the network device 120 may perform a handover procedure to hand over the terminal device 110 from the serving cell to the selected cell. Alternatively, in some example embodiments, the network device 120 may add the selected cell as a secondary cell of the terminal device 110.

Upon receiving the grant from the server 130, the terminal device 110 transmits 425 to the network device 120 a request to start the power supply, which is also referred to as a "start request". That is, the terminal device 110 requests the network device 120 to start the WPC service. If no grant is received from the server 130 within a waiting time window or the service request is rejected by the server 130, the terminal device 110 shall not request the network device 120 to start the power supply.

The start request may include an indication that the terminal device 110 is in the low battery state. Alternatively, or in addition, the start request may include a remaining battery level of the terminal device 110, for example, 100 mAh. In this way, the network device 120 may prioritize multiple terminal devices which request WPC service from the network device 120 based on respective remaining battery levels of the multiple terminal devices. For example, a terminal device with a lower battery level may be provided with the WPC service prior to another terminal device with a higher battery level.

The start request may be transmitted via a radio resource control (RRC) signaling. Alternatively, or in addition, the start request may be transmitted via a medium access control (MAC) control element (CE). The MAC CE may be an enhanced power headroom report (PHR) MAC CE.

Upon receiving the start request from the terminal device 110, the network device 120 allocates 427 a resource for the WPT signal to be transmitted to the terminal device 110.

Such a resource is dedicated for the WPT signal and is also referred to as a "WPT resource" in the following. The WPT resource is independent from a resource for a communication signal to be transmitted to the terminal device 110.

The WPT resource may comprise a frequency domain resource, a time domain resource, and a space domain resource. The frequency domain resource may be allocated or scheduled on a Physical Resource Block (PRB) basis. In the case of PRB basis, one or more PRBs are allocated to the terminal device 110 for the WPT signal. Alternatively, the frequency domain may be allocated or scheduled on a RF point basis. In the case of RF point basis, one or more specific frequency points are allocated to the terminal device 110 for the WPT signal.

The time domain resource may be allocated or scheduled on a Transmission Time Interval (TTI) basis. In the case of TTI basis, a TTI allocated for the WPT signal is occupied with the frequency domain resource allocated to the terminal device 110 for the WPT signal. Alternatively, the time domain resource may be allocated on a semi-static period basis. In the case of semi-static period basis, the terminal device 110 is provided with the WPC service using the frequency domain resource during the allocated period, which is also referred to as a harvesting period. Scheduling of the harvesting period is a semi-static schedule approach based on a WPT signal harvesting period configured by an operator of the network 100. Scheduling on the TTI basis is more flexible than scheduling on the semi-static period basis. In some example embodiments, the allocated time domain resource may be during a Discontinuous Reception (DRX) cycle of the terminal device 110. In this situation, the terminal device 110 is sleep for communication but wake up for power supply.

The space domain resource may comprise one or more beams on which the WPT signal is to be transmitted. Such a beam is also referred to as a "WPC serving beam". In the case of multi-TRP communication, the space domain resource may comprise a TRP via which the WPT signal is to be transmitted.

If the terminal device 110 is configured to measure the WPT signal, the network device 120 allocates an uplink control channel resource to the terminal device 110 for reporting the measurement on the WPT signal. For example, a physical uplink control channel (PUCCH) resource may be allocated to the terminal device 110. Additionally, the network device 120 may allocate resources for a channel state information (CSI) reference signal (RS) and reporting measurement on the CSI RS.

In some example embodiments, different TRPs may be used for communication and power supply, that is, if the communication signal and the WPT signal may be transmitted via different TRPs. In such example embodiments, the network device 120 may allocate separate PUCCH resource in the TRP for communication for reporting the measurement of WPT signal in physical layer. It is beneficial to use a TRP dedicated for power supply. For example, the interference between communication and power supply can be reduced. The power supply efficiency especially for a Time Division Duplex (TDD) cell can be improved since the TRP for power supply is used for DL only.

The network device 120 then generates configuration information concerning the allocated resource. Accordingly, the configuration information may include an indication of the allocated frequency domain resource, for example, an index of the one or more allocated PRBs, or an indication of the specific frequency point. The configuration information may include an indication of the time period during which the WPT signal is to be transmitted, i.e., an indication of the allocated time domain resource, for example, the allocated TTI, or the harvesting period. The configuration information may include an identification of the one or more beams on which the WPT signal is to be transmitted, for example, beam IDs. The configuration information may include an identification of the TRP via which the WPT signal is to be transmitted, for example, a TRP ID. The configuration information may further comprise an indication of the uplink control channel resource for reporting the measurement on the WPT signal.

In some example embodiments, different serving cells may be used for communication and power supply, that is, a communication serving cell provides the communication signal to the terminal device 110 and a power supply serving cell provides the WPT signal to the terminal device 110. In such example embodiments, at least a part of the configuration information, for example, the frequency domain resource and the time domain resource, shall be synchronized between the communication cell and the power supply cell. By synchronizing the configuration information, it is ensured that separated frequency domain resources (for example, PRBs) are allocated for communication and power supply. In this way, inter-cell interference can be avoided.

In an example, the configuration information may be synchronized between RRC layers of the communication cell and the power supply cell, for example in the case of scheduling on semi-static period basis. If the communication cell and the power supply cell are provided by different network devices (for example, in the case of inter-gNB scenario), the configuration information may be synchronized via an Xn interface between the different network devices.

In another example, user plane tunnel may be established between the communication cell and the power supply cell for the synchronization. For example, a General Packet Radio Service Tunneling Protocol user-plane (GTP-U) tunnel may be established between MAC layers of the communication cell and the power supply cell. The configuration information can be synchronized via the GTP-U tunnel. If the communication cell and the power supply cell are provided by different network devices (for example, in the case of inter-gNB scenario), the GTP-U tunnel may be established over the Xn interface between the different network devices. In the case of scheduling on TTI basis, it is beneficial to use the GTP-U tunnel for the synchronization in order to reduce the latency of the synchronization.

Continuing with the process 400, the network device 120 transmits 430 the configuration information to the terminal device 110. The configuration information may be transmitted via a RRC signaling or a physical downlink control channel (PDCCH). If PDCCH is used, the configuration information shall be transmitted during On Duration when the terminal device 110 is DRX enabled and will detect PDCCH. For example, in the case where the terminal device 110 shares the same antenna for communication and power supply.

In some example embodiments, the terminal device 110 may tune 435 a frequency circuit of the terminal device 110 based on the frequency domain resource indicated in the configuration information. For example, the frequency circuit 210 may be tuned based on the allocated PRBs or specific frequency points.

The network device 120 transmits 440 the WPT signal to the terminal device 110 based on the configuration information. For example, the network device 120 transmits 440 the WPT signal by using the allocated TRP, beam, PRBs or frequency points and during the allocated TTI or semi-static period.

The terminal device 110 receives the WPT signal from the network device 120 based on the configuration information. In some example embodiments, while receiving the WPT signal, the terminal device 110 may perform 445 a measurement on the WPT signal. The terminal device 110 may transmit 450 to the network device a result of the measurement, which is also referred to as a "WPT measurement report".

The WPT measurement report may include an Angle of Arrival (AoA) of the WPT signal, a received signal power level of the WPT signal, and a power level having been used to charge the terminal device 110, etc. The WPT measurement report may further include an identification of the TRP via which the WPT signal is received, an identification of the beam on which the WPT signal is received and an identification of the power supply cell. The WPT measurement report is transmitted by using the uplink control channel resource as indicated in the configuration information.

If CSI-RS is configured for the WPT signal, the terminal device 110 may perform measurement on the CSI-RS and transmit a CSI report to the network device 120. The CSI report and the WPT measurement report may be transmitted together or separately. The scope of the present disclosure is not limited in this regard.

The network device 120 may determine 455 whether to update (for example, reallocate) the resource for the WPT signal based on the WPT measurement report. If the network device 120 updates the resource for the WPT signal, the network device 120 may transmit 460 updated configuration information to the terminal device 110. The updated configuration information indicates the updated resource for the WPT signal. For example, at least one of the TRP ID, beam ID, the indication of the frequency domain resource, and the indication of the allocated time period is updated in the updated configuration information.

As an example, an expected received signal power level and an expected AoA of the WPT signal (e.g., the WPT signal direction is perpendicular to the antenna of the terminal device 110) is configured to cach WPC serving beam. If the measurement report from the terminal device 110 indicates that the received signal power level of the current WPC serving beam is unexpected, or the measured AoA of the WPT signal is unexpected, the network device 120 may reselect a new WPC serving beam which has the expected received signal power level and/or the expected AoA. In this example, the updated configuration information includes an identification of the new WPC serving beam.

As another example, the network device 120 may reselect a TRP for the WPT signal as needed. In this example, the updated configuration information includes an identification of the reselected TRP.

As a further example, the network device 120 may trigger an inter-cell handover (HO) or an inter-network device (for example, inter gNB) HO as needed, to hand over the terminal device 110 from a serving cell to a target cell. In the case of inter-cell HO or inter-network device HO, the updated configuration information may be included in a HO command and indicates a new resource allocated with the target cell for the WPT signal. For example, the HO command may indicate the ID of the target cell as the power supply cell, TRP IDs, beam IDs, PUCCH resource for WPT measurement report, frequency domain resource, the time period during which the WPT signal is to be transmitted, etc.

In the case of inter-network device HO, the network device 120 acting as the source network device may inform the target network device via an Xn-AP message. As such, a new WPC serving beam can be created on an AAU of the target network device if the AAU is dedicated for WPC service.

Upon receiving the updated configuration information, the terminal device 110 may tune 465 the frequency circuit of the terminal device 110 based on the frequency domain resource indicated in the updated configuration information. For example, the frequency circuit 210 may be tuned based on the allocated PRBs or specific frequency points to receive the WPT signal.

In some example embodiments, the terminal device 110 may be configured with conditional handover (CHO). In the case of CHO, the terminal device 110 can be configured with a condition related to its battery level. The network device 120 may transmit a handover configuration (e.g., a CHO configuration) to the terminal device 110. The handover configuration indicates a condition for handing over from a serving cell to a target cell and the condition is related to the battery level of the terminal device 110. If the battery level falls below the threshold or if the terminal device 110 enters a low battery state, the terminal device 110 may determine, from candidate target cells, a target cell having the WPC capability. The terminal device 110 may perform CHO from a serving cell to the target cell. In addition, in some example embodiments, the target cell may also satisfy the radio quality criteria (e.g., A1~A5 events as defined in NR RRC).

Similarly, in some example embodiments, the terminal device 110 may be configured with Conditional PSCell Change or Addition (CPAC). A condition for triggering CPAC is related to the battery level of the terminal device 110. If the battery level falls below the threshold or if the terminal device 110 enters a low battery state, the terminal device 110 may triggers the CPAC.

Continuing with the process 400, the application layer of the terminal device 110 considers that the terminal device 110 is in a good battery state if the current battery level exceeds a certain level (e.g., 2000 mAh) or the remaining battery capacity exceeds a certain capacity (e.g., 120 minutes). The application layer notifies the AS to request to terminate the WPC service.

The terminal device 110 transmits 470 to the network device 120 a request to terminate the power supply, which is also referred to as a "termination request". That is, the terminal device 110 requests the network device 120 to stop the WPC service.

In some example embodiments, the termination request may include an amount of power used by the terminal device 110 from the WPT signal. The amount of power reflects the power level harvested by the terminal device 110 from the WPC service. For example, the termination request may indicate a difference between a battery level before requesting the WPC service and a battery level upon harvesting the WPT signal for a period of time. Alternatively, or in addition, if the start request includes the remaining battery level before requesting the WPC service, the termination request may include another remaining battery level upon harvesting the WPT signal for a period of time.

The termination request may be transmitted via a RRC signaling. Alternatively, or in addition, the termination request may be transmitted via a MAC CE. The MAC CE may be an enhanced PHR MAC CE.

The terminal device 110 acting as the APP client may calculate the duration of the WPC service from the network device 120.

Upon receiving the termination request from the terminal device 110, the network device 120 terminates 475 the power supply to the terminal device 110. For example, the network device 120 may release the frequency domain resource and the time domain resource allocated for the WPT signal and stop scheduling and transmission of the WPT signal.

The terminal device 110 transmits 480 to the server 130 a message indicating that the power supply by the network device 120 is terminated. Such a message is also referred to as a "termination message" and informs the server 130 that the WPC service is finished. In this way, the network device 120 and the server 130 are synchronized. The server 130 then transmits 485, to the network device 120, an indication to release the WPC service bandwidth available for the terminal device 110.

In some example embodiments, the network device 120 may determine the amount of power used by the terminal device 110 from the WPT signal at least based on the termination request. In the example embodiments where the termination request includes the amount of power, the network device 120 may read the amount of power from the termination request. In the example embodiments where the start request includes a first battery level before requesting the WPC service and the termination request includes a second battery level upon harvesting the WPT signal for a period of time, the network device 120 may determine a difference between the first and second battery levels as the amount of power.

The network device 120 may then transmit 490 the amount of power to the CN function 140. The CN function 140 which may be a SMF acting as a CTF then generates a charging event for the terminal device 110 based on the amount of power. The CN function may notify a Charging Function (CHF) of the charging event for generating Charging Data Records (CDRs) of the terminal device 110. In this way, the operator of the network 100 may charge the user of the terminal device 110 for the WPC service.

Alternatively, or in addition, in some example embodiments, the terminal device 110 may determine the amount of power used by the terminal device 120 and transmit 482 the amount of power to the server 130. The server 130 may then transmit 483 the amount of power to the CN function 140, which generates the charging event for the terminal device 110. In this way, the operator of the network 100 may charge the user of the terminal device 110 for the WPC service.

Although transmission of the amount of power from the terminal device 110 to the server 130 is shown separately from transmission of the termination message in FIG. 4, this is merely for the purpose of illustration without any limitation. In some example embodiments, the amount of power may be included in the termination message. In some example embodiments, the amount of power may be included in a message different from the termination message.

Example Methods and Apparatuses

Figure 5:
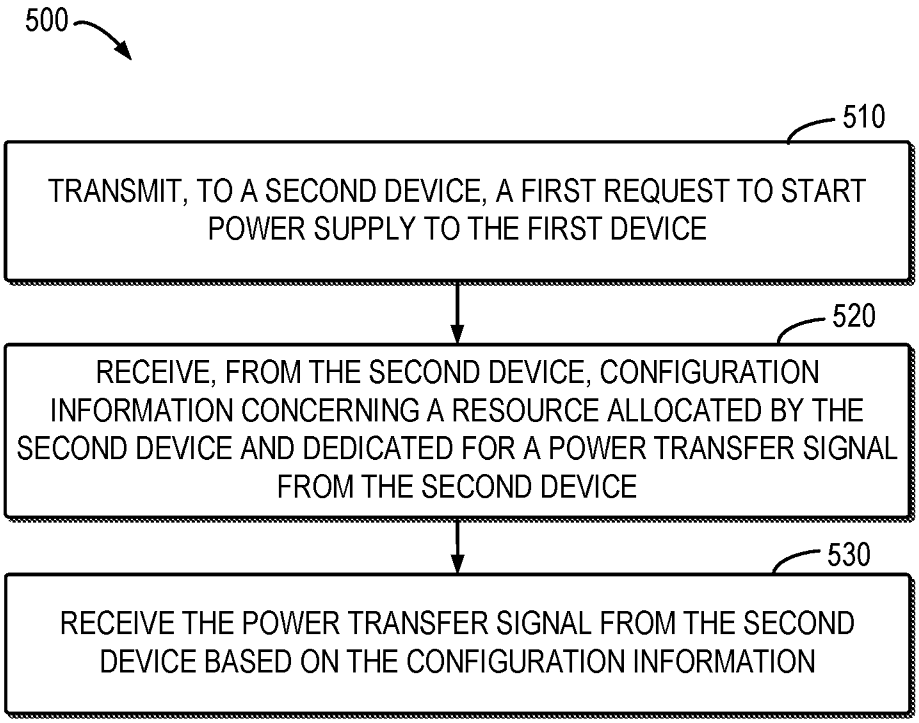
FIG. 5 illustrates a flowchart of an example method implemented at a first device according to some example embodiments of the present disclosure.

FIG. 5 shows a flowchart of an example method 500 in accordance with some example embodiments of the present disclosure. The method 500 can be implemented at a first device, for example, the terminal device 110 shown in FIG. 1. It is to be understood that the method 500 may include additional blocks not shown and/or may omit some shown blocks, and the scope of the present disclosure is not limited in this regard. The second device may be the network device 120, and the third device may be a device for implementing the server 130.

At block 510, the first device transmits, to a second device, a first request to start power supply to the first device. For example, the first device transmits a start request for the WPC service to the second device.

At block 520, the first device receives, from the second device, configuration information concerning a resource allocated by the second device and dedicated for a power transfer signal from the second device. The power transfer signal (e.g., the WPT signal) is used to provide power to the first device.

In some example embodiments, the configuration information comprises at least one of: an identification of a beam on which the power transfer signal is to be transmitted, an identification of a Transmission and Reception Point via which the power transfer signal is to be transmitted, an indication of a frequency domain resource for transmitting the power transfer signal, an indication of a time period during which the power transfer signal is to be transmitted, or an indication of a control channel resource for transmitting a measurement result of the power transfer signal to the second device.

At block 530, the first device receives the power transfer signal from the second device based on the configuration information. For example, the first device may receive the WPT signal by using the frequency domain resource, the TRP and the beam during a time period as indicated by the configuration information.

In some example embodiments, to receive the power transfer signal, the first device tunes a frequency circuit of the first device based on a frequency domain resource indicated in the configuration information; and receives the power transfer signal by an antenna coupled to the tuned frequency circuit. In some example embodiments, the antenna is shared by the power transfer signal and a communication signal. The first device routes the power transfer signal from the antenna to the frequency circuit by a switching circuit coupled between the antenna and the frequency circuit during a time period indicated in the configuration information.

In some example embodiments, if a battery level of the first device is below a threshold, the first device determines a target cell with a capability of power supply; and performs a handover from a serving cell of the first device to the target cell. In some example embodiments, if the target cell satisfies a radio quality criterion, the first device performs the handover.

In some example embodiments, to determine the target cell, the first device receives, from the second device, capability information indicating a set of cells with the capability of power supply; and selecting the target cell from the set of cells.

In some example embodiments, the first device performs a measurement on the power transfer signal; and transmits, to the second device, a result of the measurement by using a control channel resource indicated in the configuration information.

In some example embodiments, the first device receives, from the second device, a handover command for a handover from a serving cell of the first device to a target cell. The target cell is selected by the second device based on the result of the measurement and the handover command indicates a further resource for a further power transfer signal. In response to receiving the handover command, the first device performs the handover from the serving cell to the target cell; and receives, in the target cell, the further power transfer signal based on the further resource.

In some example embodiments, the first device transmits, to a third device associated with the second device, a first message indicating a requirement of the power supply to the first device; and receives, from the third device, a grant for the power supply to the first device by the second device. In some example embodiments, in response to transmitting to the second device a second request to terminate the power supply to the first device, the first device transmits to the third device a second message indicating that the power supply by the second device is terminated.

In some example embodiments, the first device transmits, to the third device, an amount of power used by the first device. The amount of power may be included in the second message. Alternatively, or in addition, the amount of power may be included in a third message different from the second message.

In some example embodiments, the first device transmits, to the second device, a second request to terminate the power supply to the first device.

In some example embodiments, the first device may be a terminal device and the second device may be a network device.

Figure 6:
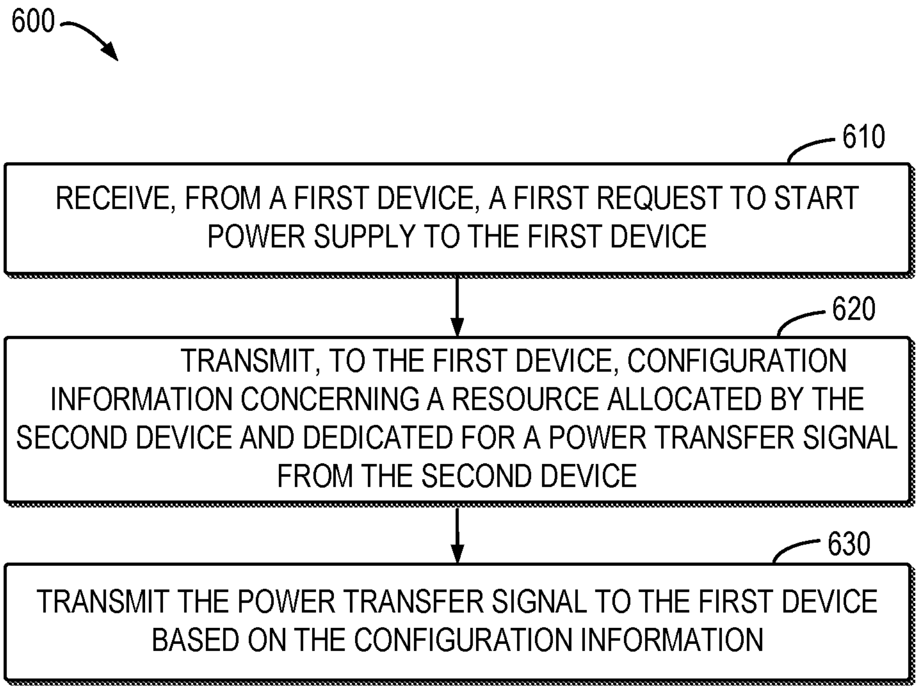
FIG. 6 illustrates a flowchart of an example method implemented at a second device according to some example embodiments of the present disclosure.

FIG. 6 shows a flowchart of an example method 600 in accordance with some example embodiments of the present disclosure. The method 600 can be implemented at the second device, for example, the network device 120 shown in FIG. 1. It is to be understood that the method 600 may include additional blocks not shown and/or may omit some shown blocks, and the scope of the present disclosure is not limited in this regard. The first device may be the terminal device 110, the third device may be a device for implementing the server 130 and the fourth device may be a device for implementing the CN function 140

At block 610, the second device receives, from a first device, a first request to start power supply to the first device. For example, the second device receives the start request for the WPC service from the first device.

At block 620, the second device transmits, to the first device, configuration information concerning a resource allocated by the second device and dedicated for a power transfer signal from the second device. The power transfer signal is used to provide power to the first device.

In some example embodiments, the configuration information comprises at least one of: an identification of a beam on which the power transfer signal is to be transmitted, an identification of a Transmission and Reception Point via which the power transfer signal is to be transmitted, an indication of a frequency domain resource for transmitting the power transfer signal, an indication of a time period during which the power transfer signal is to be transmitted, or an indication of a control channel resource for transmitting a measurement result of the power transfer signal to the second device.

At block 630, the second device transmits the power transfer signal to the first device based on the configuration information. For example, the second device may transmit the WPT signal by using the frequency domain resource, the TRP and the beam during a time period as indicated by the configuration information.

In some example embodiments, the second device receives, from the first device, a result of a measurement on the power transfer signal by using a control channel resource indicated in the configuration information. In some example embodiments, the second device selects a target cell for the first device based on the result of the measurement; determines a further resource for a further power transfer signal in the target cell; and transmits, to the first device, a handover command for a handover from a serving cell of the first device to the target cell. The handover command indicates the further resource for the further power transfer signal.

In some example embodiments, the second device receives, from a third device associated with the second device, a grant for the power supply to the first device by the second device.

In some example embodiments, in response to receiving the grant, the second device determines whether a serving cell of the first device has a capability of power supply. If the serving cell lacks the capability of power supply, the first device hands over the first device from the serving cell to a target cell with the capability of power supply. Alternatively, the first device adds a target cell with the capability of power supply as a secondary cell of the first device.

In some example embodiments, the second device receives, from the third device, an indication to release a bandwidth available for the power supply to the first device.

In some example embodiments, the second device receives, from the first device, a second request to terminate the power supply to the first device; and in response to receiving the second request, the second device terminates transmission of the power transfer signal to the first device.

In some example embodiments, the second device determines an amount of power used by the first device at least based on the second request; and transmits the amount of power to a fourth device acting as a charging transfer function.

In some example embodiments, the second device synchronizes at least a part of the configuration information via a user plane tunnel between a medium access control layer of a first serving cell and a medium access control layer of a second serving cell of the first device, the first serving cell providing the power transfer signal and the second serving cell providing a communication signal. Alternatively, the second device synchronizes at least a part of the configuration information between a radio resource control layer of the first serving cell and a radio resource control layer of the second serving cell.

In some example embodiments, the second device transmits, to the first device, capability information indicating a set of cells with the capability of power supply.

In some example embodiments, the second device transmits, to the first device, a handover configuration indicating a condition for handing over from a serving cell to a target cell. The condition is related to a battery level of the first device.

In some example embodiments, the first device may be a terminal device and the second device may be a network device.

Figure 7:
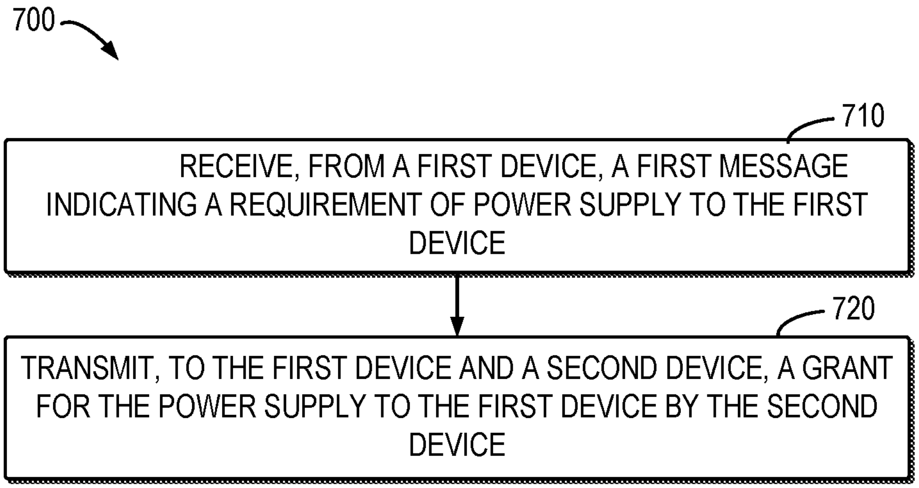
FIG. 7 illustrates a flowchart of an example method implemented at a third device according to some example embodiments of the present disclosure.

FIG. 7 shows a flowchart of an example method 700 in accordance with some example embodiments of the present disclosure. The method 700 can be implemented at a third device, for example, a device for implementing the server 130 shown in FIG. 1. It is to be understood that the method 700 may include additional blocks not shown and/or may omit some shown blocks, and the scope of the present disclosure is not limited in this regard. The first device may be the terminal device 110, and the second device may be the network device 120.

At block 710, the third device receives, from a first device, a first message indicating a requirement of power supply to the first device. At block 720, the third device transmits, to the first device and a second device, a grant for the power supply to the first device by the second device.

In some example embodiments, the third device receives, from the first device, a second message indicating that the power supply by the second device is terminated. In response to receiving the second message, the third device transmits, to the second device, an indication to release a bandwidth available for the power supply to the first device.

In some example embodiments, the third device receives, from the first device, an amount of power used by the first device. The third device then transmits the amount of power to a fourth device acting as a charging transfer function. The amount of power may be included in the second message. Alternatively, or in addition, the amount of power may be included in a third message different from the second message.

Figure 8:
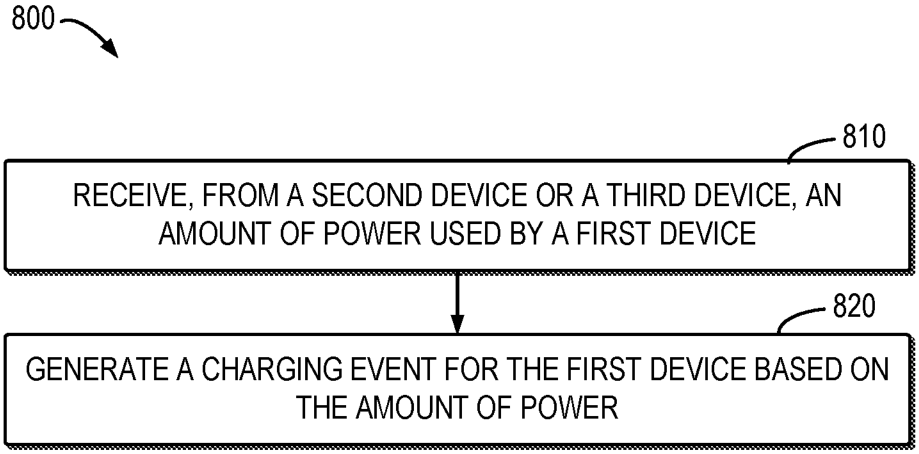
FIG. 8 illustrates a flowchart of an example method implemented at a fourth device according to some example embodiments of the present disclosure.

FIG. 8 shows a flowchart of an example method 800 in accordance with some example embodiments of the present disclosure. The method 800 can be implemented at a fourth device, for example, a device for implementing the CN function shown in FIG. 1. It is to be understood that the method 800 may include additional blocks not shown and/or may omit some shown blocks, and the scope of the present disclosure is not limited in this regard. The first device may be the terminal device 110, the second device may be the network device 120 and the third device may be a device for implementing the server 130.

At block 810, the fourth device receives, from a second device or a third device associated with the second device, an amount of power used by a first device. The power is provided to the first device via a power transfer signal from the second device and the power transfer signal is allocated with a dedicated resource. At block 820, the fourth device generates a charging event for the first device based on the amount of power.

In some example embodiments, a first apparatus capable of performing the method 500 may comprise means for performing the respective steps of the method 500. The means may be implemented in any suitable form. For example, the means may be implemented in a circuitry or software module.

In some example embodiments, the first apparatus capable of performing the method 500 (for example, the terminal device 110) comprises: means for transmitting, to a second apparatus, a first request to start power supply to the first apparatus; means for receiving, from the second apparatus, configuration information concerning a resource allocated by the second apparatus and dedicated for a power transfer signal from the second apparatus, the power transfer signal used to provide power to the first apparatus; and means for receiving the power transfer signal from the second apparatus based on the configuration information.

In some example embodiments, the configuration information comprises at least one of: an identification of a beam on which the power transfer signal is to be transmitted, an identification of a Transmission and Reception Point via which the power transfer signal is to be transmitted, an indication of a frequency domain resource for transmitting the power transfer signal, an indication of a time period during which the power transfer signal is to be transmitted, or an indication of a control channel resource for transmitting a measurement result of the power transfer signal to the second apparatus.

In some example embodiments, the first apparatus further comprises: means for in accordance with a determination that a battery level of the first apparatus is below a threshold, determining a target cell with a capability of power supply; and means for performing a handover from a serving cell of the first apparatus to the target cell.

In some example embodiments, means for performing a handover from a serving cell of the first apparatus to the target cell comprises means for in accordance with a determination that the target cell satisfies a radio quality criterion, performing the handover.

In some example embodiments, the means for determining the target cell comprises: means for receiving, from the second apparatus, capability information indicating a set of cells with the capability of power supply; and means for selecting the target cell from the set of cells.

In some example embodiments, the first apparatus further comprises: means for performing a measurement on the power transfer signal; and means for transmitting, to the second apparatus, a result of the measurement by using a control channel resource indicated in the configuration information.

In some example embodiments, the first apparatus further comprises: means for receiving, from the second apparatus, a handover command for a handover from a serving cell of the first apparatus to a target cell, the target cell selected by the second apparatus based on the result of the measurement and the handover command indicating a further resource for a further power transfer signal; means for in response to receiving the handover command, performing the handover from the serving cell to the target cell; and means for receiving, in the target cell, the further power transfer signal based on the further resource.

In some example embodiments, the first apparatus further comprises: means for transmitting, to a third apparatus associated with the second apparatus, a first message indicating a requirement of the power supply to the first apparatus; and means for receiving, from the third apparatus, a grant for the power supply to the first apparatus by the second apparatus.

In some example embodiments, the first apparatus further comprises: means for in response to transmitting to the second apparatus a second request to terminate the power supply to the first apparatus, transmitting to the third apparatus a second message indicating that the power supply by the second apparatus is terminated.

In some example embodiments, the first apparatus further comprises: means for transmitting, to the third apparatus, an amount of power used by the first device apparatus. The amount of power may be included in the second message. Alternatively, or in addition, the amount of power may be included in a third message different from the second message.

In some example embodiments, the first apparatus further comprises: means for transmitting, to the second apparatus, a second request to terminate the power supply to the first apparatus.

In some example embodiments, the means for receiving the power transfer signal comprises: means for tuning a frequency circuit of the first apparatus based on a frequency domain resource indicated in the configuration information; and means for receiving the power transfer signal by an antenna coupled to the tuned frequency circuit.

In some example embodiments, the antenna is shared by the power transfer signal and a communication signal, and the first apparatus further comprises: means for routing the power transfer signal from the antenna to the frequency circuit by a switching circuit coupled between the antenna and the frequency circuit during a time period indicated in the configuration information.

In some example embodiments, the first apparatus is a terminal device and the second apparatus is a network device.

In some example embodiments, a second apparatus capable of performing the method 600 may comprise means for performing the respective steps of the method 600. The means may be implemented in any suitable form. For example, the means may be implemented in a circuitry or software module.

In some example embodiments, the second apparatus capable of performing the method 600 (for example, the network device 120) comprises: means for receiving, from a first apparatus, a first request to start power supply to the first apparatus; means for transmitting, to the first apparatus, configuration information concerning a resource allocated by the second apparatus and dedicated for a power transfer signal from the second apparatus, the power transfer signal used to provide power to the first apparatus; and means for transmitting the power transfer signal to the first apparatus based on the configuration information.

In some example embodiments, the configuration information comprises at least one of: an identification of a beam on which the power transfer signal is to be transmitted, an identification of a Transmission and Reception Point via which the power transfer signal is to be transmitted, an indication of a frequency domain resource for transmitting the power transfer signal, an indication of a time period during which the power transfer signal is to be transmitted, or an indication of a control channel resource for transmitting a measurement result of the power transfer signal to the second apparatus.

In some example embodiments, the second apparatus further comprises: means for receiving, from the first apparatus, a result of a measurement on the power transfer signal by using a control channel resource indicated in the configuration information.

In some example embodiments, the second apparatus further comprises: means for selecting a target cell for the first apparatus based on the result of the measurement; means for determining a further resource for a further power transfer signal in the target cell; and means for transmitting, to the first apparatus, a handover command for a handover from a serving cell of the first apparatus to the target cell, the handover command indicating the further resource for the further power transfer signal.

In some example embodiments, the second apparatus further comprises: means for receiving, from a third apparatus associated with the second apparatus, a grant for the power supply to the first apparatus by the second apparatus.

In some example embodiments, the second apparatus further comprises: means for in response to receiving the grant, determining whether a serving cell of the first apparatus has a capability of power supply; and means for in accordance with a determination that the serving cell lacks the capability of power supply, handing over the first apparatus from the serving cell to a target cell with the capability of power supply, or adding a target cell with the capability of power supply as a secondary cell of the first apparatus.

In some example embodiments, the second apparatus further comprises: means for receiving, from the third apparatus, an indication to release a bandwidth available for the power supply to the first apparatus.

In some example embodiments, the second apparatus further comprises: means for receiving, from the first apparatus, a second request to terminate the power supply to the first apparatus; and means for in response to receiving the second request, terminating transmission of the power transfer signal to the first apparatus.

In some example embodiments, the second apparatus further comprises: means for determining an amount of power used by the first apparatus at least based on the second request; and means for transmitting the amount of power to a fourth apparatus acting as a charging transfer function.

In some example embodiments, the second apparatus further comprises: means for synchronizing at least a part of the configuration information via a user plane tunnel between a medium access control layer of a first serving cell and a medium access control layer of a second serving cell of the first apparatus, the first serving cell providing the power transfer signal and the second serving cell providing a communication signal, or means for synchronizing at least a part of the configuration information between a radio resource control layer of the first serving cell and a radio resource control layer of the second serving cell.

In some example embodiments, the second apparatus further comprises: means for transmitting, to the first apparatus, capability information indicating a set of cells with the capability of power supply.

In some example embodiments, the second apparatus further comprises: means for transmitting, to the first apparatus, a handover configuration indicating a condition for handing over from a serving cell to a target cell, the condition related to a battery level of the first apparatus.

In some example embodiments, the first apparatus is a terminal device and the second apparatus is a network device.

In some example embodiments, a third apparatus capable of performing the method 700 may comprise means for performing the respective steps of the method 700. The means may be implemented in any suitable form. For example, the means may be implemented in a circuitry or software module.

In some example embodiments, the third apparatus capable of performing the method 700 (for example, the server 120) comprises: means for receiving, from a first apparatus, a first message indicating a requirement of power supply to the first apparatus; and means for transmitting, to the first apparatus and a second apparatus, a grant for the power supply to the first apparatus by the second apparatus.

In some example embodiments, the third apparatus further comprises: means for receiving, from the first apparatus, a second message indicating that the power supply by the second apparatus is terminated; and means for in response to receiving the second message, transmitting, to the second apparatus, an indication to release a bandwidth available for the power supply to the first apparatus.

In some example embodiments, the third apparatus further comprises: means for receiving, from the first apparatus, an amount of power used by the first apparatus; and means for transmitting the amount of power to a fourth apparatus acting as a charging transfer function. The amount of power may be included in the second message. Alternatively, or in addition, the amount of power may be included in a third message different from the second message.

In some example embodiments, a fourth apparatus capable of performing the method 800 may comprise means for performing the respective steps of the method 800. The means may be implemented in any suitable form. For example, the means may be implemented in a circuitry or software module.

In some example embodiments, the fourth apparatus capable of performing the method 800 (for example, the CN function 140) comprises: means for receiving, from a second apparatus or a third apparatus associated with the second apparatus, an amount of power used by a first apparatus, the power provided to the first apparatus via a power transfer signal from the second apparatus and the power transfer signal allocated with a dedicated resource; and means for generating a charging event for the first apparatus based on the amount of power.

Figure 9:
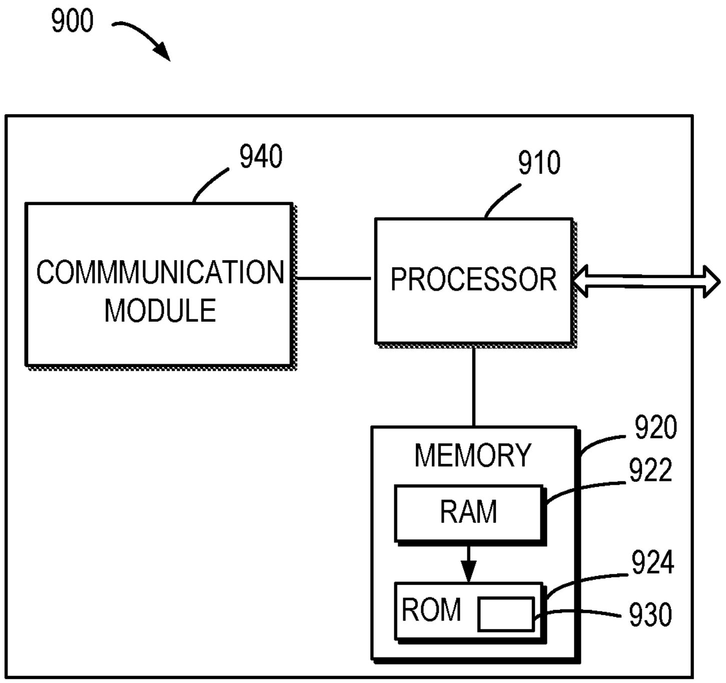
FIG. 9 illustrates a simplified block diagram of a device that is suitable for implementing example embodiments of the present disclosure.

FIG. 9 is a simplified block diagram of a device 900 that is suitable for implementing embodiments of the present disclosure. For example, the terminal device 110 and/or the network device 120 can be implemented by the device 900. As shown, the device 900 includes one or more processors 910, one or more memories 920 coupled to the processor 910, and one or more communication modules 940 coupled to the processor 910.

The communication module 940 is for bidirectional communications. The communication module 940 has at least one antenna to facilitate communication. The communication interface may represent any interface that is necessary for communication with other network elements.

The processor 910 may be of any type suitable to the local technical network and may include one or more of the following: general purpose computers, special purpose computers, microprocessors, digital signal processors (DSPs) and processors based on multicore processor architecture, as non-limiting examples. The device 900 may have multiple processors, such as an application specific integrated circuit chip that is slaved in time to a clock which synchronizes the main processor.

The memory 920 may include one or more non-volatile memories and one or more volatile memories. Examples of the non-volatile memories include, but are not limited to, a Read Only Memory (ROM) 924, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 922 and other volatile memories that will not last in the power-down duration.

A computer program 930 includes computer executable instructions that are executed by the associated processor 910. The program 930 may be stored in the ROM 924. The processor 910 may perform any suitable actions and processing by loading the program 930 into the RAM 922.

The embodiments of the present disclosure may be implemented by means of the program 930 so that the device 900 may perform any process of the disclosure as discussed with reference to FIGS. 5-8. The embodiments of the present disclosure may also be implemented by hardware or by a combination of software and hardware.

Figure 10:
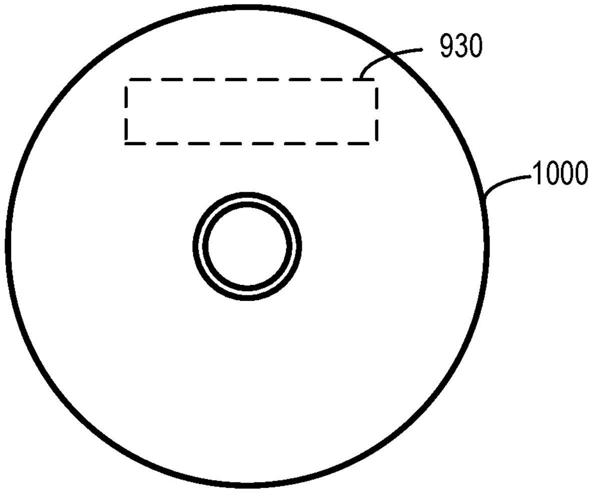
FIG. 10 illustrates a block diagram of an example computer readable medium in accordance with some example embodiments of the present disclosure.

In some example embodiments, the program 930 may be tangibly contained in a computer readable medium which may be included in the device 900 (such as in the memory 920) or other storage devices that are accessible by the device 900. The device 900 may load the program 930 from the computer readable medium to the RAM 922 for execution. The computer readable medium may include any types of tangible non-volatile storage, such as ROM, EPROM, a flash memory, a hard disk, CD, DVD, and the like. FIG. 10 shows an example of the computer readable medium 1000 in form of CD or DVD. The computer readable medium has the program 930 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 500 as described above with reference to FIG. 5 and/or the method 600 as described above with reference to FIG. 6, and/or the method 700 as described above with reference to FIG. 7, and/or the method 800 as described above with reference to FIG. 8. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an crasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device comprising:

at least one processor; and at least one memory including computer program codes;

the at least one memory and the computer program codes are configured to, with the at least one processor, cause the first device at least to:

transmit, to a second device, a first request to start power supply to the first device;

receive, from second device, configuration information concerning a resource allocated by the second device and dedicated for a power transfer signal from the second device, the power transfer signal used to provide power to the first device, wherein the configuration information comprises at least one of:

an identification of a beam on which the power transfer signal is to be transmitted, an identification of a Transmission and Reception Point via which the power transfer signal is to be transmitted, or an indication of a control channel resource for transmitting a measurement result of the power transfer signal to the second device;

receive the power transfer signal from the second device based on the configuration information;

perform a measurement on the power transfer signal;

transmit, to the second device, a result of the measurement by using a control channel resource indicated in the configuration information:

receive, from the second device, a handover command for a handover from a serving cell of the first device to a target cell, the target cell selected by the second device based on the result of the measurement and the handover command indicating a further resource for a further power transfer signal;

in response to receiving the handover command, perform the handover from the serving cell to the target cell; and receive, from the target cell, the further power transfer signal based on the further resource.

2. The first device of claim 1, wherein the at least one memory and the computer program codes are configured to, with the at least one processor, further cause the first device to:

in accordance with a determination that a battery level of the first device is below a threshold, determine a target cell with a capability of power supply; and perform a handover from a serving cell of the first device to the target cell.

3. The first device of claim 2, wherein the at least one memory and the computer program codes are configured to, with the at least one processor, cause the first device to perform the handover by:

in accordance with a determination that the target cell satisfies a radio quality criterion, performing the handover.

4. The first device of claim 2, wherein the at least one memory and the computer program codes are configured to, with the at least one processor, cause the first device to determine the target cell by:

receiving, from the second device, capability information indicating a set of cells with the capability of power supply; and selecting the target cell from the set of cells.

5. The first device of claim 1, wherein the at least one memory and the computer program codes are configured to, with the at least one processor, further cause the first device to at least one of:

transmit, to a third device associated with the second device, a first message indicating a requirement of the power supply to the first device, and receive, from the third device, a grant for the power supply to the first device by the second device;

in response to transmitting to the second device a second request to terminate the power supply to the first device, transmit to the third device a second message indicating that the power supply by the second device is terminated; or transmit, to the third device, an amount of power used by the first device.

6. The first device of claim 1, wherein the at least one memory and the computer program codes are configured to, with the at least one processor, further cause the first device to:

transmit, to the second device, a second request to terminate the power supply to the first device.

7. The first device of claim 1, wherein the at least one memory and the computer program codes are configured to, with the at least one processor, cause the first device to receive the power transfer signal by:

tuning a frequency circuit of the first device based on a frequency domain resource indicated in the configuration information; and receiving the power transfer signal by an antenna coupled to the tuned frequency circuit.

8. The first device of claim 7, wherein the antenna is shared by the power transfer signal and a communication signal, and the at least one memory and the computer program codes are configured to, with the at least one processor, further cause the first device to route the power transfer signal from the antenna to the frequency circuit by a switching circuit coupled between the antenna and the frequency circuit during a time period indicated in the configuration information.

9. A second device comprising:

at least one processor; and at least one memory including computer program codes;

the at least one memory and the computer program codes are configured to, with the at least one processor, cause the second device at least to:

receive, from a first device, a first request to start power supply to the first device;

transmit, to the first device, configuration information concerning a resource allocated by the second device and dedicated for a power transfer signal from the second device, the power transfer signal used to provide power to the first device, wherein the configuration information comprises at least one of:

an identification of a beam on which the power transfer signal is to be transmitted, an identification of a Transmission and Reception Point via which the power transfer signal is to be transmitted, or an indication of a control channel resource for transmitting a measurement result of the power transfer signal to the second device;

transmit the power transfer signal to the first device based on the configuration information;

receive, from the first device, a result of a measurement on the power transfer signal by using a control channel resource indicated in the configuration information;

select a target cell for the first device based on the result of the measurement;

determine a further resource for a further power transfer signal from the target cell; and transmit, to the first device, a handover command for a handover from a serving cell of the first device to the target cell, the handover command indicating the further resource for the further power transfer signal.

10. The second device of claim 9, wherein the at least one memory and the computer program codes are configured to, with the at least one processor, further cause the second device to: receive, from a third device associated with the second device, at least one of a grant for the power supply to the first device by the second device or an indication to release a bandwidth available for the power supply to the first device.

11. The second device of claim 10, wherein the at least one memory and the computer program codes are configured to, with the at least one processor, further cause the second device to:

in response to receiving the grant, determine whether a serving cell of the first device has a capability of power supply; and in accordance with a determination that the serving cell lacks the capability of power supply, hand over the first device from the serving cell to a target cell with the capability of power supply, or add a target cell with the capability of power supply as a secondary cell of the first device.

12. The second device of claim 9, wherein the at least one memory and the computer program codes are configured to, with the at least one processor, further cause the second device to:

receive, from the first device, a second request to terminate the power supply to the first device; and in response to receiving the second request, terminate transmission of the power transfer signal to the first device.

13. The second device of claim 12, wherein the at least one memory and the computer program codes are configured to, with the at least one processor, further cause the second device to:

determine an amount of power used by the first device based on the second request; and transmit the amount of power to a fourth device acting as a charging transfer function.

14. The second device of claim 9, wherein the at least one memory and the computer program codes are configured to, with the at least one processor, further cause the second device to: transmit, to the first device, capability information indicating a set of cells with the capability of power supply.

15. The second device of claim 9, wherein the at least one memory and the computer program codes are configured to, with the at least one processor, further cause the second device to: transmit, to the first device, handover configuration indicating a condition for handing over from a serving cell to a target cell, the condition related to a battery level of the first device.

* * * * *